PATENTED JULY 14, 1964

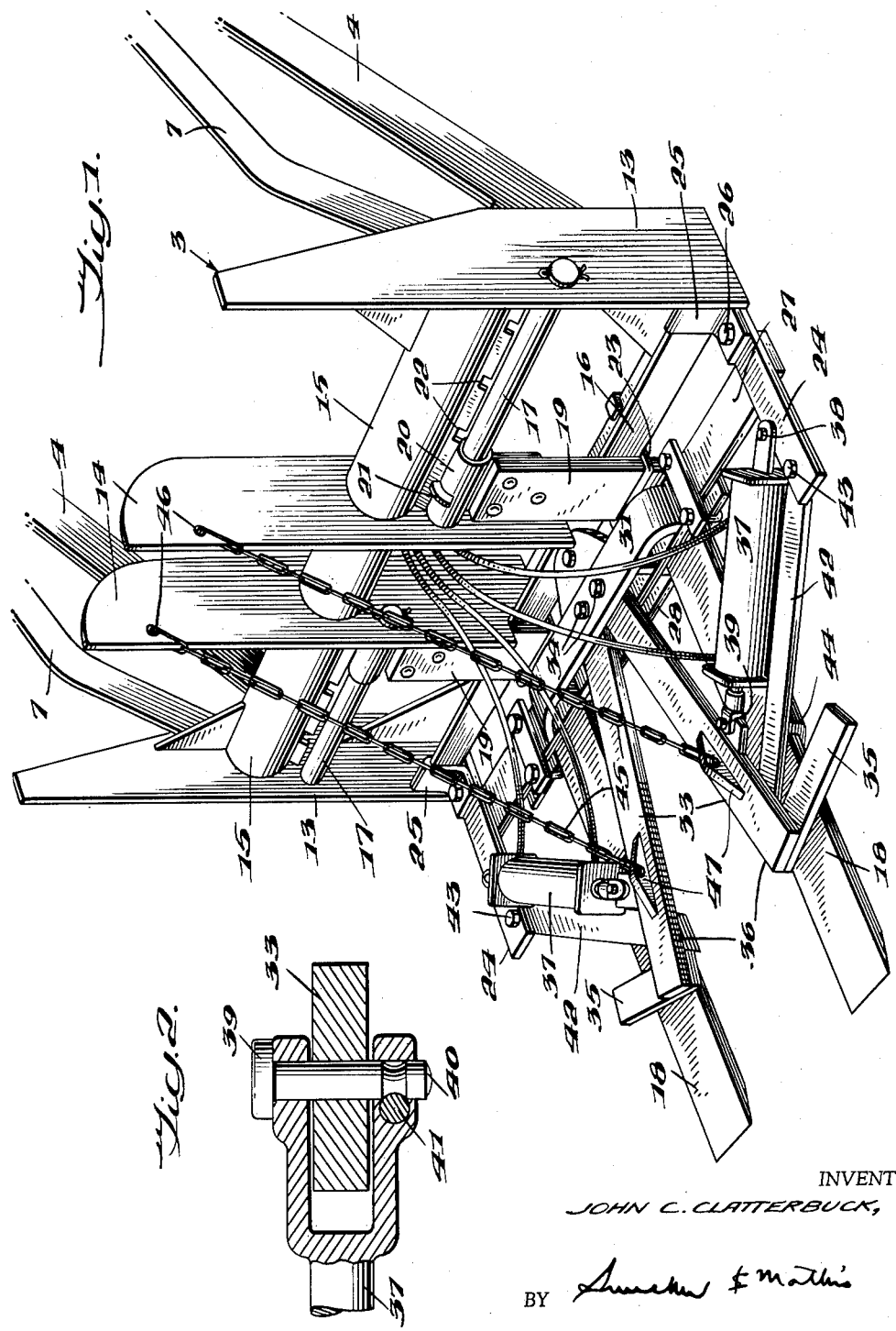

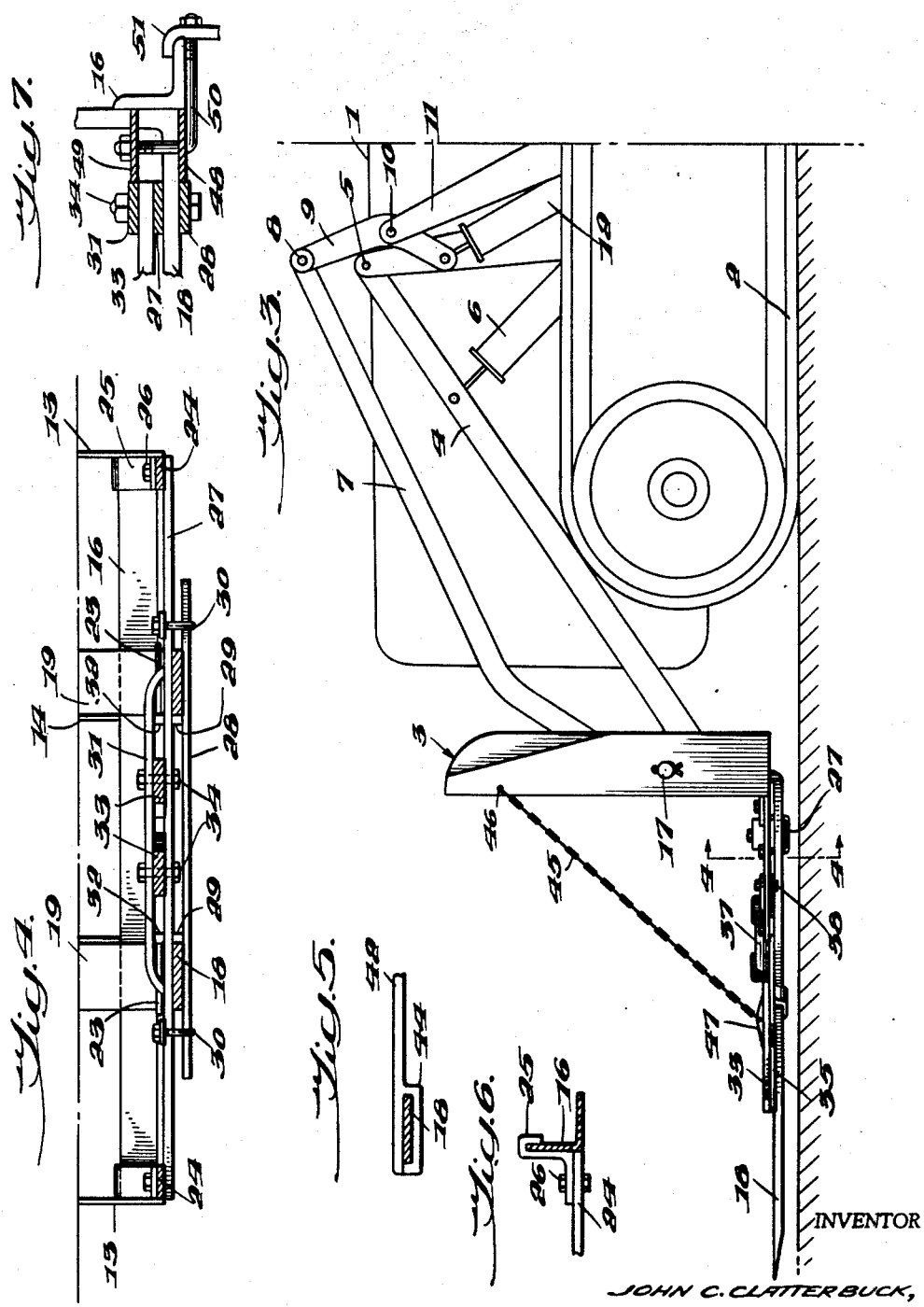

3,140,786
FRONT END ATTACHMENTS FOR TRACTORS
John C. Clatterbuck, R.F.D. 1, Purcellville, Va.
Filed June 2, 1960, Ser. No. 33,448
8 Claims. (Cl. 214—147)

This invention relates to improvements in front end attachments for tractors and, more particularly, to attachments for the front ends of tractors adapted for removing trees, brush, posts and the like from the ground.

Various attempts have been made heretofore to provide devices which will pull up and remove small trees, brush, posts and the like, as attachments for the front end or back end of a tractor, or for unitary construction therewith. Such pulling attachments applied to the front end of the tractor permit of better removability than those at the back, but have been difficult to construct and to operate with the required power for the purpose. None of these has proven to be entirely satisfactory heretofore.

One object of this invention is to simplify and improve front end attachments for tractors for effective removal of trees, brush, posts and the like from the ground easily and quickly.

Another object of the invention is to provide an attachment for the front end of a tractor which may be applied to and removed from the tractor quickly and readily by tractor operators, available labor, etc., and yet, when in place, will be effective in its operation.

Still another object of the invention is to provide a sturdy and rigid construction which is, nevertheless, sufficiently simple and inexpensive to build and to use, and effective for the removal of objects from the ground by utilizing the elevator power of tractor lift mechanism to effect sufficient pulling action to remove trees, brush, posts, etc., from the ground.

These objects may be accomplished, according to one embodiment of the invention, by providing a lift attachment on the front end portion of a conventional tractor, such as a crawler-type unit, and preferably mounted on the swinging boom arms usually provided thereon. Usually, the swinging arms of the tractor are provided with fork members. These fork members may be utilized as supports for the lifting head.

A pair of jaws operate transversely in opposed relation by means of hydraulic members which extend transversely thereof to move the jaw members toward and from each other. Sufficient gripping action may be obtained to hold the object tightly in place during the raising and lowering of the lifting head. The lifting head is detachably mounted on the elevating structure of the tractor, so as to be readily removable therefrom and yet, when in place, it is secured effectively.

Detachable fastenings are provided for holding the carriage on the elevating assembly of the tractor, whereby the head is secured thereto so as to be operated by the elevating mechanism and yet may be quickly and easily removable. The jaws move transversely over the conventional lifting forks usually provided on the loader of the tractor and cooperate to hold the attachment in place during use.

This embodiment of the invention is illustrated in the accompanying drawings, in which:

FIG. 1 is a perspective view of the lifting head assembly;

FIG. 2 is a detail cross section through one of the mounting pins;

FIG. 3 is a partial side elevation of a tractor, showing the attachment applied thereto;

FIG. 4 is a cross section therethrough on the line 4—4 in FIG. 3;

FIG. 5 is a detail cross section through one of the loading forks and showing the connection of the attachment thereto;

FIG. 6 is a detail cross section, showing the carriage holding clamp; and

FIG. 7 is a detail cross section through a portion of the carriage assembly.

The invention is illustrated in one embodiment in connection with a conventional tractor, generally indicated at 1 and preferably having crawler supports 2 mounting the tractor for transportation. The tractor is self-propelled and operated in any desired or usual manner, which does not require detailed disclosure since this mechanism is well understood in the art.

Supported on the front end portion of the tractor 1 is an elevating assembly, generally indicated at 3, forming part of a loader or lifting structure. The elevating assembly 3 is carried by a pair of boom arms 4 pivotally mounted at 5 on the tractor 1 and capable of being raised and lowered by hydraulic hoists, indicated generally at 6. The raising and lowering movements of the boom arms 4 is by swinging motion about the pivots 5 for effecting raising and lowering movements of the elevating assembly 3 of the loader.

The elevating assembly 3 is capable of tilting motion during the raising and lowering movements as, for example, to maintain the elevating assembly substantially vertical during the upward swinging movement of the boom arms 4. Such control of the elevating assembly is provided by control arms 7 connected with the elevating assembly 3 and extending therefrom to pivots 8 on bellcrank levers 9. The bellcrank levers are pivotally mounted at 10 on supports 11 provided on the tractor 1. The opposite end of each bellcrank lever 9 is connected with a hydraulic hoist 12, so as to effect the desired motion of the linkage 7–9.

I have not illustrated in detail the control of the hydraulic hoists 6 and 12. Any suitable valve means usually provided on the tractor 1 may be used for this purpose. The parts are manipulated under the control of the operator in the usual manner.

The elevating mechanism is shown more in detail in FIG. 1. It comprises upright end plates 13 and a pair of upright intermediate plates 14 connected together in spaced relation by tubing 15 and by a cross bar 16 which hold these parts in rigid relation. Guide rods 17 also extend between the adjacent pairs of plates 13 and 14.

Loader forks are shown at 18. Each of the loader forks comprises a horizontal tine portion with an upright supporting portion that is indicated at 19. Each of the upright portions 19 has a sleeve 20 fixed thereon and slidably mounted on the corresponding rod 17 for sliding movement lengthwise of the rod between the adjacent pair of plates 13 and 14.

A bar segment 21 is provided on each sleeve 20 in position to engage in notches 22 on the spacer tube 15, so as to hold each fork 18 in a laterally adjusted position with respect to the elevating assembly of the loader. Thus, by swinging motion of the forks 18 about the axis of the rods 17, the bar segments 21 can be disengaged from the notches 20 and the forks then moved laterally of the loader to adjusted positions. It is preferred that the forks be moved to the innermost positions, as illustrated in FIG. 1, for use with this attachment. In their normal operation, the forks bear at their back ends against the transverse bar 16 and they are adapted to be clamped in this relation by U-bolts 23, detachably bolted to the horizontal flange of the bar 16.

The attachment mounted on the loader of the tractor includes a carriage assembly. This carriage assembly comprises a pair of support bars 24 extending horizontally forward from the elevating mechanism 3 of the loader. Each of the bars 24 is detachably mounted on the transverse bar 16, as shown in FIGS. 1 and 6, by means of a clamp 25 arranged in embracing relation with the upper edge of the bar 16 and detachably secured by a bolt 26. Thus, upon removal of the bolts 26, the clamps 25 may be disengaged from the bar 16, so as to remove the carriage assembly from the loader.

Extending transversely between the support bars 24 is an elongated support table or plate 27. This table or plate 27 may be permanently secured at its opposite ends to the support bars 24 as, for example, by being welded, bolted, or otherwise connected therewith, or may be formed in one integral piece therewith, if desired. The table or plate 27 preferably is in such position as to extend transversely directly over the upper faces of the forks 18 so as to be seated directly thereon in the normal position of the parts.

A bottom plate 28 extends transversely beneath the forks 18 and holds the latter spaced apart by spacers 29 secured rigidly to the plate 28 (FIG. 4). The bottom plate 28 is connected with the table or plate 27 in any suitable or desired manner, preferably in rigid relation. In the example illustrated in the drawings, this connection is provided by U-bolts 30.

Also connected with the table or plate 27 is a transversely extending cap plate 31, which is disposed over the mid portion of the plate 27 and is held spaced therefrom by suitable spacers 32. The opposite ends of the cap plate 31 are shown as turned downward and secured to the upper face of the table or plate 27. While this is a desirable arrangement, it is evident that the construction can be modified to a substantial extent, so long as a secure and rigid relation is provided therebetween.

A pair of jaw members are indicated at 33, extending lengthwise of the forks 18 and intermediate the latter. Each of the jaw members 33 extends at one end intermediate the plates 27 and 31 and is pivotally connected therewith by a bolt 34. The bolts 34 may serve also to anchor the parts 27, 31 and 33 together if the bars should not be welded or otherwise fixed together.

The opposite end of each jaw member 33 has a transversely extending guide segment 35 rigidly fixed thereto and bearing upon the upper face of the adjacent fork 18, being slidable transversely thereof, so as to guide the jaw in its transverse movement relative to the fork. The guide segment 35 is sufficiently elongated so as to remain in overlapping relation with the fork 18 throughout the transverse movement of the jaw.

The inner face of each jaw 33 is serrated or otherwise provided with gripping means, indicated generally at 36, so as to effect a tight gripping engagement with the object to be raised or lowered.

The jaws 33 are adapted to be manipulated by hydraulic hoists 37 extending transversely with respect to the jaws and mounted upon the carriage assembly. Each hydraulic hoist 37 is connected at one end by a pivot 38 with the adjacent support bar 24. At the opposite end of each hoist 37, a pivot pin 39 extends through the end portion of the hoist and through a portion of the adjacent jaw 33 as, for example, a web formed thereon.

The pins 38 and 39 are adapted to be readily detachable for separating and removing the hoists from the structure. Each of the pins may be constructed substantially as illustrated in FIG. 2, wherein the pin 39 is provided with an annular groove 40 therein through which a transverse locking pin 41 extends at one side of the end portion of the cylinder 37. The locking pin is spring pressed and has a circumferentially reduced portion, whereby upon endwise movement of the locking pin 41 relative to the pin 39, this reduced portion registers with the groove 40 and thereby allows the pin 39 to be removed. Normally, however, the full diameter of the locking pin 41 is in alignment with the groove 40 and prevents the separation and removal of the pin from the structure.

The hydraulic cylinders 37 are adapted to be operated from suitable control valves provided within convenient reach of the operator and are supplied with hydraulic fluid from the source on the tractor. These are double-acting cylinders, and the hoses thereof may be located in protected positions behind the respective cylinders and extend through the open frame structure of the loader and along one or the other of the arms 4 and 7 to the control means on the tractor.

The mechanism is also protected by fender bars 42 which extend transversely in front of the cylinders 37. Each of the fender bars 42 is connected at one end as, for example, by a bolt 43 with one of the support bars 24 and extends from the latter over the adjacent fork 18. A loop portion 44 on the inner end of each fender bar 42 is disposed in embracing relation with the fork 18, so as to hold the fender bar 42 thereagainst and in place with respect to the fork.

Each of the jaws 33 may be provided with supplementary holding means if found desirable. In this embodiment of the invention, the holding means is illustrated in the form of flexible devices 45 connected at one end at 46 with the upright plates 14 of the loader and at the opposite end with a segment 47 secured upon the upper face of the jaw 33. This allows freedom of transverse swinging movement of the jaws relative to each other and yet aids in supporting the free ends thereof during the lifting operation.

The tractor and loader are capable of use for many purposes without this attachment. Usually, the fork arms 18 are disposed in their outermost positions on the elevating assembly 3 of the loader when the equipment is used for other purpose than the removal of trees and other objects from the ground. The loader can be modified, however, very simply and readily and the attachment applied thereto whenever it is desired to use the equipment for this purpose.

The loader assembly 3 is lowered substantially to ground level, as indicated in FIGS. 1 and 3. The fork arms 18 preferably are moved inward to the positions shown in FIG. 1, so as to afford the maximum support for the lifting mechanism during the pulling action. The attachment then may be inserted directly over the forks 18 and moved backward to the elevating assembly 3 of the loader. In such position, the engagement of the clamps 25 and the securing of the bolts 26 will hold the attachment in place effectively. Likewise, the detachment and removal of these parts will enable the attachment to be separated and removed from the equipment very simply and readily.

With the attachment in place on the forks 18 and the hoses of the cylinders 37 connected with the control mechanism on the tractor, the equipment is ready for use in engaging and pulling objects from the ground.

The pulling attachment preferably engages the object as close to the ground as possible, so as to permit of the maximum lifting action, especially when trees are involved that may have relatively long roots. With the jaws 33 open, as shown in FIG. 1, the propelling mechanism of the tractor is operated to move the jaws into embracing engagement with the object. Then, upon operation of the cylinders 37, the jaws are manipulated so as to grip firmly the peripheral surface of the object and to hold it therebetween. The gripping action is limited only by the power of the cylinders 37 and is usually sufficient to effect the removal of most trees, posts and other objects capable of being handled by tractors.

After thus engaging the object, the hydraulic cylinders 6 are operated to effect an upward swinging movement of the boom arms 4 for lifting the loader elevating assembly 3. The arms 4 usually are pivoted to the elevating assembly, as also the arms 7, so that by proper control of the cylinders 12, the arms 7 can be utilized to maintain the elevating assembly 3 in a vertical position during the pulling action. Thus a straight vertical pull can be effected with respect to the object, so as to lift it bodily from the ground and to pull out of the ground all of the roots attached to a tree or bush, for example, in a simple and effective manner. The extent of the vertical lifting action is limited only by the size of the tractor and of the boom arms 4. As the boom arms 4 swing upward during such lifting movement, the tractor may be moved forward, so as to maintain the object substantially in a straight upright position, which effects a maximum removal of roots.

The jaws 33 can be manipulated to discharge the removed object, or the latter may be carried while held in the jaws to a desired point of ejectment.

The loader mechanism of the tractor can be used after removal of the attachment for any normal or desired operation. For example, it may be used for handling logs, with or without the retaining finger often employed in connection therewith. Such use of the equipment is alternate to the use of the attachment, which latter can be readily inserted or removed, as found desirable. It is only necessary to remove the two clamping bolts 26 in order to remove the attachment from the equipment.

The forks 18 may be provided with runners extending thereunder, supported by portions of the attachment, if found desirable, to prevent bolts, fastenings and other parts of the attachment from digging in the ground.

The carriage assembly may be provided, if desired, with abutment means to limit the backward sliding movement thereof relative to the loader unit or tractor, as I have illustrated in FIG. 7. Abutment plates 48 and 49 are secured, as by welding, to the table 28 and the tie plate 31, or 27, and extend therefrom to the forward face of the bar 16. A J-bolt 50 is anchored at one end to the plates 48 and 49 holding those in abutting relation to the bar 16. At the opposite end, the bolt 50 is connected with a clamp 51 which engages the opposite edge of the bar 16, like the clamps connected with the U-bolts 23. The bolt 50, as well as the U-bolts 23, if used, must be detached for removal of the carriage assembly from the tractor.

While the invention has been illustrated and described in one embodiment, it is recognized that other variations and changes may be made therein without departing from the invention set forth in the claims.

I claim:

1. In a tractor having a front end loader elevating assembly mounted thereon for raising and lowering movements and hydraulic power means operatively connected therewith for effecting said raising and lowering movements, said assembly including a pair of forks extending forwardly therefrom in laterally spaced relation, the combination therewith, of an attachment including a supporting table mounted on the assembly, a pair of jaw members extending lengthwise of the forks, means pivotally supporting the inner ends of the jaw members on the table and with said jaw members extending outwardly therefrom in overlying relation with the forks, means fixed to the outer end portions of the jaw members and supported in bearing relation upon the forks, and hydraulic power devices operatively connected with the jaw members and with the table for effecting clamping action of the jaw members on an object therebetween.

2. In a tractor having a loader elevating assembly, boom arms pivotally mounted on the tractor and connected with the assembly for raising and lowering movements upon swinging action of the boom arms, and hydraulic power means operatively connected with the boom arms for effecting said raising and lowering movements, and forks carried by the assembly and extending forwardly therefrom in laterally spaced relation, the combination therewith, of an attachment including a supporting table, a pair of jaws extending forwardly from the supporting table, means pivotally mounting the jaws at their inner ends about upright axes on the table and with the jaws extending outwardly therefrom in overlying relation with the forks, means fixed to the outer end portions of the jaw members and supported in bearing relation upon the forks, and hydraulic power devices operatively connected with the jaws and with the table for effecting transverse movement of the jaws toward and from each other.

3. In a tractor having a loader elevating assembly, boom arms pivotally mounted on the tractor and connected with the assembly for raising and lowering movements upon swinging action of the boom arms, and hydraulic power means operatively connected with the boom arms for effecting said raising and lowering movements, and forks carried by the assembly and extending forwardly therefrom in laterally spaced relation, the combination therewith, of an attachment including a supporting table, a pair of jaws extending forwardly from the supporting table, means pivotally mounting the jaws at their inner ends about upright axes on the table and with the jaws extending outwardly therefrom in overlying relation with the forks, hydraulic power devices operatively connected with the jaws and with the table for effecting transverse movement of the jaws toward and from each other, and guide segments connected rigidly with the jaws and extending transversely in guiding relation with the upper faces of the forks for holding the jaws elevated above the forks.

4. In a tractor having a loader elevating assembly, boom arms pivotally mounted on the tractor and connected with the assembly for raising and lowering movements upon swinging action of the boom arms, and hydraulic power means operatively connected with the boom arms for effecting said raising and lowering movements, and forks carried by the assembly and extending forwardly therefrom in laterally spaced relation, the combination therewith, of an attachment including a supporting table, a pair of jaws extending forwardly from the supporting table, means pivotally mounting the jaws at their inner ends about upright axes on the table and with the jaws extending outwardly therefrom in overlying relation with the forks, hydraulic power devices operatively connected with the jaws and with the table for effecting transverse movement of the jaws toward and from each other, and support bars connected with the assembly and extending forwardly therefrom in laterally spaced relation, said table extending in bridging relation between the support bars and mounted on the support bars at opposite ends thereof.

5. In a tractor having a loader elevating assembly, boom arms pivotally mounted on the tractor and connected with the assembly for raising and lowering movements upon swinging action of the boom arms, and hydraulic power means operatively connected with the boom arms for effecting said raising and lowering movements, forks carried by the assembly and extending forwardly therefrom in laterally spaced relation, the combination therewith, of an attachment including a supporting table, a pair of jaws extending forwardly from the supporting table, means pivotally mounting the jaws at their inner ends about upright axes on the table and with the jaws extending outwardly therefrom in overlying relation with the forks, hydraulic power devices operatively connected with the jaws and with the table for effecting transverse movement of the jaws toward and from each other, support bars connected with the assembly and extending forwardly therefrom in laterally spaced relation, said table extending in bridging relation between the support bars and mounted on the support bars at opposite ends thereof, and means detachably connecting the support bars with the assembly for separation and removal of the attachment therefrom.

6. In a tractor having a loader elevating assembly, boom arms pivotally mounted on the tractor and connected with the assembly for raising and lowering movements upon swinging action of the boom arms, hydraulic power means operatively connected with the boom arms for effecting said raising and lowering movements, and forks carried by the assembly and extending forwardly therefrom in laterally spaced relation, the combination therewith, of an attachment including a supporting table, a pair of jaws extending forwardly from the supporting table, means pivotally mounting the jaws at their inner ends about upright axes on the table and with the jaws extending outwardly therefrom in overlying relation with the forks, hydraulic power devices operatively connected with the jaws and with the table for effecting transverse movement of the jaws toward and from each other, and support bars connected with the assembly and extending forwardly therefrom in laterally spaced relation, said table extending in bridging relation between the support bars and mounted on the support bars at opposite ends thereof, fender members extending along the power devices forwardly thereof and connected at one end with the support bars and at the opposite end with the forks.

7. In a tractor having a loader elevating assembly, boom arms pivotally mounted on the tractor and connected with the assembly for raising and lowering movements upon swinging action of the boom arms, hydraulic power means operatively connected with the boom arms for effecting said raising and lowering movements, the combination therewith, of an attachment including a supporting table, a pair of jaws extending forwardly from the supporting table, means pivotally mounting the jaws at their inner ends about upright axes on the table and with the jaws extending outwardly therefrom, hydraulic power devices operatively connected with the jaws and with the table for effecting transverse movement of the jaws toward and from each other, and support bars connected with the assembly and extending forwardly therefrom in laterally spaced relation, said table extending in bridging relation between the support bars and mounted on the support bars at opposite ends thereof, said support bars being connected with the hydraulic power devices and supporting the latter.

8. In a tractor having a front end elevating assembly, said assembly including a pair of forks, means mounting the forks on the assembly for lateral movement toward and from each other, and a cross bar rearwardly of the forks, the combination therewith, of a support table extending transversely of the forks, spacer means in abutting relation between the rear edge portion of the table and the cross bar for holding the support table in place, means for tieing the table to the cross bar, a pair of jaw members mounted on the table for movement toward and from each other, and power means operatively connected with the jaw members for effecting opening and closing movements thereof relative to each other.

References Cited in the file of this patent
UNITED STATES PATENTS

| | | |
|---|---|---|
| 2,505,923 | Taylor et al. | May 2, 1950 |
| 2,535,099 | Slick | Dec. 26, 1950 |
| 2,537,234 | Osmundson | Jan. 9, 1951 |
| 2,662,729 | Fountain | Dec. 15, 1953 |
| 2,663,952 | Winget | Dec. 29, 1953 |
| 2,706,060 | Ferrario et al. | Apr. 12, 1955 |
| 2,740,210 | Hamborg | Apr. 3, 1956 |
| 2,747,305 | Marshall | May 29, 1956 |
| 2,803,431 | Cooper | Aug. 20, 1957 |
| 2,837,229 | Markel | June 3, 1958 |
| 3,057,599 | Clatterbuck | Oct. 9, 1962 |